US011946446B2

(12) United States Patent
Baun et al.

(10) Patent No.: US 11,946,446 B2
(45) Date of Patent: Apr. 2, 2024

(54) NACELLE FOR A WIND TURBINE

(71) Applicant: Vestas Wind Systems A/S, Aarhus N (DK)

(72) Inventors: Torben Ladegaard Baun, Skødstrup (DK); Jesper Lykkegaard Neubauer, Hornslet (DK)

(73) Assignee: Vestas Wind Systems A/S, Aarhus N. (DK)

( * ) Notice: Subject to any disclaimer, the term of this patent is extended or adjusted under 35 U.S.C. 154(b) by 95 days.

(21) Appl. No.: 17/772,312

(22) PCT Filed: Nov. 23, 2020

(86) PCT No.: PCT/DK2020/050322
§ 371 (c)(1),
(2) Date: Apr. 27, 2022

(87) PCT Pub. No.: WO2021/098931
PCT Pub. Date: May 27, 2021

(65) Prior Publication Data
US 2022/0403827 A1      Dec. 22, 2022

(30) Foreign Application Priority Data
Nov. 22, 2019   (DK) .................................. 2019 70713

(51) Int. Cl.
*F03D 13/10*      (2016.01)
*F03D 80/00*      (2016.01)
(Continued)

(52) U.S. Cl.
CPC ........... *F03D 13/10* (2016.05); *F03D 13/122* (2023.08); *F03D 80/003* (2023.08); *F03D 80/50* (2016.05);
(Continued)

(58) Field of Classification Search
CPC ........ F03D 80/80; F03D 80/88; F03D 80/881; F03D 80/821; F03D 80/82; F03D 80/003;
(Continued)

(56) References Cited

U.S. PATENT DOCUMENTS

| | | | |
|---|---|---|---|
| 2009/0129931 A1* | 5/2009 | Stiesdal | F03D 80/00 416/204 R |
| 2013/0011272 A1* | 1/2013 | Mortensen | F03D 13/10 416/244 R |

(Continued)

FOREIGN PATENT DOCUMENTS

| | | |
|---|---|---|
| DE | 10013442 C1 | 10/2001 |
| EP | 2412970 A1 | 2/2012 |

(Continued)

OTHER PUBLICATIONS

Danish Patent and Trademark Office, Search and Examination Report in PA 2019 70713, May 6, 2020.
European Patent Office, International Search Report and Written Opinion in PCT Application No. PCT/DK2020/050322, Feb. 5, 2021.

*Primary Examiner* — Courtney D Heinle
*Assistant Examiner* — Andrew J Marien
(74) *Attorney, Agent, or Firm* — Wood Herron & Evans LLP

(57) ABSTRACT

A wind turbine nacelle configured for mounting on a wind turbine tower and for supporting a rotor-supporting assembly, the nacelle comprising a main unit, and at least one auxiliary unit. To increase flexibility and improve assembly and maintenance procedures of the wind turbine, the auxiliary unit comprises at least two sub units each accommodating at least one wind turbine component, e.g. a converter or a transformer. The sub units are attached individually to the main unit or they are joined and attached as one component to the main unit.

25 Claims, 14 Drawing Sheets

(51) Int. Cl.
   *F03D 80/50* (2016.01)
   *F03D 80/60* (2016.01)
   *F03D 80/80* (2016.01)

(52) U.S. Cl.
   CPC ........... *F03D 80/60* (2016.05); *F03D 80/601* (2023.08); *F03D 80/80* (2016.05); *F03D 80/821* (2023.08); *F03D 80/85* (2016.05); *F03D 80/88* (2016.05); *F03D 80/881* (2023.08); *F05B 2230/61* (2013.01); *F05B 2240/14* (2013.01); *F05B 2240/142* (2013.01)

(58) Field of Classification Search
   CPC ........ F03D 80/85; F03D 80/60; F03D 80/601; F03D 13/122; F05B 2230/61; F05B 2240/14; F05B 2260/30
   See application file for complete search history.

(56) References Cited

U.S. PATENT DOCUMENTS

2013/0115099 A1* 5/2013 Valero Lafuente ..... F03D 80/50
                                                      416/244 R
2017/0363071 A1* 12/2017 Baun ....................... F03D 15/00

FOREIGN PATENT DOCUMENTS

| EP | 2550453 | A2 | 1/2013 |
| EP | 3247899 | A1 | 11/2017 |
| EP | 3276169 | A1 | 1/2018 |
| WO | 2011117005 | A2 | 9/2011 |

\* cited by examiner

NACELLE FOR A WIND TURBINE

INTRODUCTION

The present disclosure relates to a nacelle for a wind turbine, the nacelle comprising a main unit and at least one auxiliary unit mounted on a side of the main unit. The nacelle of the present disclosure is particularly suitable for use in large wind turbines. The disclosure further relates to a method for erecting a wind turbine comprising such a nacelle.

BACKGROUND

Wind turbines increase in size in terms of nominal power output as well as in terms of physical dimensions of the individual parts of the wind turbine. Therefore, the size of the nacelle must also be increased to accommodate the required wind turbine components. Wind turbines are normally transported from the location or locations of manufacture of the individual parts to the operating site where the wind turbine is erected.

SUMMARY

It is an object of embodiments of the disclosure to facilitate further modularity, ease of design and manufacturing, and allow for improved maintenance of wind turbines. It is a further object of embodiments of the disclosure to provide a nacelle which is transportable using ordinary transport means and to lower transportation and handling costs without limiting the possible size of the nacelle.

According to these and other objects, the disclosure provides a wind turbine nacelle configured for mounting on a wind turbine tower and for supporting a rotor-supporting assembly defining a rotational axis, the nacelle comprising:
  a main unit arranged to be connected to a wind turbine tower and housing the rotor-supporting assembly, and at least one auxiliary unit.

The main unit and the auxiliary unit are separate units arranged e.g. side by side in a direction away from the rotational axis, and assembled in a first interface, and at least one of the auxiliary units comprises at least two sub units, e.g. assembled in a second interface or attached individually to the main unit without being joined to each other.

The main unit may be considered as the central part of the nacelle. The main unit may be arranged to be connected to a wind turbine tower via a yawing arrangement. Accordingly, it may comprise at least a part of the yawing arrangement. Additionally, it may house the rotor-supporting assembly. Particularly, the main unit may include the main frame to allow the forces from the rotor and drivetrain to be directed down into the tower via the yawing arrangement.

In a wind turbine where the main unit houses the rotor-supporting assembly, the auxiliary unit or units may typically house a plurality of different wind turbine components. The separation of the auxiliary unit into at least two sub units allows different suppliers to supply different separate units. This allows the packaging and logistic during transport of the at least one components to be carried out by separate suppliers, and at the site of construction of the wind turbine, each supplied sub unit with its at least one component can be assembled and used directly to form an auxiliary unit for the nacelle. During the entire shipping and assembly procedure, the at least one component may remain encapsulated in the sub unit, and optimal protection of the at least one component may therefore be provided throughout the shipping and assembly procedure.

Particularly, in areas where the at least one component may be soiled by dirt, rain, water, or sand etc., the continuous encapsulation and use of the at least one component in a sub unit forming part of the final nacelle offers potentially an increased lifetime and a reduced mall functioning. The number of shifts in responsibility may also be reduced since the supplier may remain responsible for the at least one component and the sub unit throughout the shipping and assembly procedure e.g. until a seal into the sub unit is broken and the at least one component is connected to other wind turbine components housed in other sub units or in the main unit.

Particularly, different wind turbine components can be delivered in sealed containers forming a number of sub units, and the seal may remain intact until the sub units are assembled to form part of the nacelle. In a final assembly state, e.g. where all wind turbine components are installed in the nacelle, and the nacelle is in place on the tower, the sealed container may be opened and connections between the different wind turbine components may be established. Until this moment, the encapsulation of the at least one component in the sub unit is in the state provided by the supplier.

The auxiliary and/or the main units may be formed with size and/or the outer shape comparable to, or equal to, the size and shape of a shipping freight container. Each unit thereby inherits the advantages of shipping freight containers with respect to handling, transportation, and storage. Shipping freight containers can for example be handled anywhere in the world by ship, train, and truck etc. and at lower costs compared to bulk transport.

The cost savings are even more pronounced by shipping freight containers constituting the units. A shipping freight container is also referred to as an intermodal container, a standard freight container, a box container, a sea fright container, or an ISO container, and refers in general to a container used to store and move materials and products in the global containerized intermodal freight transport system for intercontinental traffic. The shipping freight container may follow the dimensional and structural specifications in the ISO standard of ISO 668:2013 for series 1 freight containers.

In one embodiment, the nacelle comprises two auxiliary units each having half the size of one shipping freight container following the dimensional and structural specifications in the ISO standard of ISO 668:2013 for series 1 freight containers, and arranged such that the two half parts of the container can be assembled to one container during transport, and split into two auxiliary units to be arranged e.g. on opposite sides of the main unit. The container may particularly be split in an interface extending in the longitudinal direction of the container, i.e. the longest direction of the container.

The nacelle may be carried either directly by the tower, or indirectly via intermediate tower structures. If the wind turbine is of the traditional horizontal axis type, the nacelle is typically carried by a yawing arrangement directly between the tower top and the nacelle. The disclosure may, however, also relate to a multiple rotor wind turbine of the kind where more than one nacelle are carried by a transverse beam structure which is again carried by the tower.

The disclosure may relate to an upwind wind turbine or to a downwind wind turbine.

The main unit is the part connecting the nacelle to the tower, either directly or indirectly via the said intermediate tower structure or structures. The main unit may particularly be the central part of the nacelle and houses parts of the drivetrain such as at least a part of the rotor shaft.

The wind turbine could be a direct drive wind turbine with the generator typically placed outside the nacelle, or the wind turbine could be with the generator located e.g. in the main unit. The main unit supports the rotor via the rotor shaft.

The main unit may, depending on the type of wind turbine, comprise further parts, e.g. a gear box, a bearing system and different kinds of peripheral equipment, e.g. for lubrication, cooling, and control purpose. The main unit may particularly comprise a main frame connecting the drivetrain and the tower or intermediate tower structure, e.g. via a yawing arrangement. The main frame may particularly be a casted component.

The mainframe may be rotatable relative to the tower via a yawing arrangement. This may either be facilitated by connecting the main frame to the tower via the yawing arrangement, or by connecting at least two main frames of individual nacelle structures to a tower via said intermediate tower structure which is again joined to the tower via a yawing arrangement.

The main unit and the auxiliary unit are assembled in the first interface. The first interface may be particularly suitable for allowing release of the auxiliary unit from the main unit after the main unit is assembled on the tower top. For that purpose, the first interface may comprise mutually interlocking structural features on the main unit and on the auxiliary unit. Examples of such mutually interlocking features may be protrusions on one of the main and auxiliary unit and indentations or holes on the other one of the main and auxiliary unit, the first interface may be a bolted interface allowing releasable joining of the main and auxiliary units, or the auxiliary unit may be held in place on the main unit by cables by which the auxiliary unit can be lowered to the ground for service, replacement of components or for transport of components and personnel between ground and the nacelle. In one embodiment, the first interface is configured such that the auxiliary unit can be received by the main unit when the auxiliary unit is lowered in close vicinity to the main unit. Such an interface may be constituted by hooks or an upwardly and outwardly projecting track on at least one of the main and auxiliary units.

In one embodiment, the sub units are attached individually to the main unit. In this embodiment, the first interface interacts with each sub unit individually. In another embodiment, the sub units are assembled in the second interface. The second interface may be particularly suitable for allowing release of one sub unit from another sub unit. For that purpose, the second interface may comprise mutually interlocking structural features on the sub units. Examples of such mutually interlocking features may be protrusions on one of the sub units and indentations or holes on the other one of the sub units. The second interface may be a bolted interface allowing releasable joining of the sub units from each other, or the sub units may be joined by cables by which the one sub unit can be lowered to the ground for service, replacement of components or for transport of components and personnel between ground and the nacelle. In one embodiment, the second interface is configured such that one sub unit can be received by another sub unit when the sub unit is lowered in close vicinity to the other sub unit. Such an interface may be constituted by hooks or an upwardly and outwardly projecting track on at least one of one or both of the sub units.

One sub unit may form an upper unit and another one of the sub units may form a lower unit. The upper unit and lower unit are aligned in a vertical row. In this embodiment, the lower unit may particularly be considered for at least one components needing frequent maintenance or replacement, and the second interface may include cables by which the upper sub unit can be lowered to the ground for service, replacement of components, or for transport of components and personnel between ground and the nacelle.

In one embodiment, the upper unit is in an altitude above the main unit. In that case, the upper unit may also be considered for at least one component imposing a higher safety risk, and by the higher location, fire and heat is more easily isolated in the upper unit.

The lower unit may also be considered for at least one component imposing a higher safety risk, and by the lower location, it may be released and send to the ground in case of fire etc.

The upper unit may form a roof for the lower unit meaning that the upper surface of the lower unit is covered by a lower surface of the upper unit. For that purpose, the lower unit and the upper unit may have nearly identical shapes and/or sizes when seen in a horizontal cross section. The lower and upper units may be nearly identical units, and they may have essentially the same content. They may e.g. both contain a transformer and a converter.

In one embodiment, the auxiliary unit formed by an upper and a lower sub unit has a height which is essentially equal to the height of the main unit, e.g. from 80-120 percent of the height of the main unit.

In one embodiment, the main unit defines sidewalls extending between a bottom and a roof. In this embodiment, both the lower and the upper unit could be suspended on the same sidewall of the main unit.

If the sub units are joined in a second interface, it may particularly extend transverse to the first interface, e.g. perpendicularly to the first interface. In one embodiment, the first interface is essentially planner and follows a side surface of the main unit and the auxiliary unit. The interface may extend in a plane being parallel to the rotational axis and having a surface normal being perpendicular to the rotational axis.

Both the main unit and the sub units may have wall parts facing each other to provide a double-sided wall structure.

A gap may be defined between the sub units and the main unit and/or between two sub units. Accordingly, at least one of the first interface and the second interface may define a gap between the walls, i.e. between the main unit and the auxiliary unit or between the sub units of the auxiliary units.

In one embodiment, there is a gap between both sub units and the main unit, in one embodiment there is a gap between only one of the sub units and the main unit, in one embodiment, there is a gap between the two sub units, and in one embodiment there is a gap between the sub units and between the sub units and the main unit. The gap may allow air to pass between the main and auxiliary units or between the sub units of the auxiliary units and can thereby increase safety by preventing fire spreading or thermal convection between the units between which there is a gap. The gap may further increase cooling in the units.

An entrance may be defined from the main unit to at least one of the sub units, and/or from one sub unit to the other sub unit. The nacelle may comprise a gasket sealingly engaging two sub units or a sub unit and a main unit to form a sealing engagement between the engaged parts.

The gasket around an entrance from a main unit to a sub unit may particularly engage a wall of both the main unit and the sub unit, and a gasket around an entrance from a sub unit to a sub unit may particularly engage a wall of both sub units.

Each sub unit may form an interior space which can be separated completely from a space in the main unit and/or from a space in the other sub unit. For that purpose, the sub units may comprise suitable sealing means for sealing any opening, e.g. openings around cables or pipes extending from the main unit into a sub unit or extending between two sub units.

One sub unit may form a forward unit, another one of the sub units may form a rearward unit, and the forward unit and rearward unit being aligned in a horizontal row. In this embodiment, the rearward unit may particularly be considered rearward in a direction from the hub of the wind turbine and downwards in the direction of the rotor. In a typical upwind turbine, the wind turbine control will keep the hub in an upwind direction when the wind turbine is operational. The rearward unit may particularly comprise at least one component imposing a higher safety risk, and by the rearward location, wind will send hazardous contaminants and fire etc. away from the wind turbine and increase safety for personnel involved in maintenance or assembly etc.

The auxiliary unit may accommodate at least one component which interacts with a wind turbine component in the main unit. The interaction may include electrical communication of signals or power or by communication of cooling or lubrication fluid.

The power conversion assembly converts the power from the generator into a desired energy form. The power conversion assembly may be configured for delivering either electrical power, e.g. in AC or DC, or for converting electrical power from the generator into other forms of energy, e.g. into hydrogen, ammonia, or methanol.

In case of electrical energy, the power conversion assembly may be configured for linking the generator e.g. to an external power grid. In that case, the power conversion assembly may be constituted e.g. by a converter, a transformer, and a switch gear. Any such components may be comprised in the power conversion assembly.

The generator may, as an example, be an asynchronous or synchronous generator, e.g. an asynchronous or synchronous generator, and the converter voltage may be in same range as a generator voltage, sometimes referred to as Stator voltage.

The generator, in another example, may be a doubly fed induction generator (DFIG). In that case, the voltage on the converter could be different from the Generator stator voltage. The converter is connected to generator rotor, and is normally the same voltage or a lower voltages than the stator voltage.

Low voltage may e.g. be considered as voltages up to 1000V. Medium voltage may be considered as voltages of 1 KV to about 60 kV. The generator Voltage could be low voltage, or medium voltage.

In a wind turbine configured for producing hydrogen, ammonia, or methanol, the power conversion assembly may comprise an electrolysis cell configured for generating the substance based on electrical power from the generator.

In other embodiments, the wind turbine may store energy, and the power conversion assembly may comprise a battery.

The operative component may e.g. be selected from the group consisting of: a transformer, a converter, a battery, and a fuel-cell. Accordingly, the auxiliary unit may comprise an outer surface facing towards the main unit and including an interface for electrical or fluid communication facilitating such operative components.

In a corresponding manner, one, or each of the sub units may accommodate an operative component which interacts with a wind turbine component in another sub unit. The operative component in one sub unit may e.g. be selected from the group consisting of: a transformer, a converter, a battery, and a fuel-cell. Accordingly, the sub unit may comprise an outer surface facing towards another sub unit and including an interface for electrical or fluid communication and facilitating these specific components.

The operative component in one sub unit may have a function being identical to a function of an operative component in another sub-component. This provides a double function where different components are dedicated to identical functions. One of the two identically functioning components may be contained in one of the sub unit and the other component may be contained in another sub unit.

In case of failure, the wind turbine may continue operational on reduced power while the operative component in one of the sub units is replaced, e.g. by replacing the entire sub unit.

At least one sub unit may accommodate an operative component which is suspended directly on the main unit.

The sub unit may be sealed and an electronic alarm structure may sense theft or intrusion of water, humidity, or undesired temperatures etc. The sub unit may comprise climate control, e.g. in the form of a dehumidifier, an air conditioning device, or a heater.

The sub unit may particularly be self-sustained with its own power supply in the form of batteries, or solar cells etc. to allow the alarm structure or the climate control to remain operational during transport and assembly.

The sub unit may include an identification structure with identification data, e.g. a tag, identifying the operative component and the location of the sub unit on the nacelle. The identification tag may e.g. identify to which auxiliary unit the sub unit belongs, and it may identify the latest service or replacement of the operative component or entire sub unit.

The identification structure may include electronic radio communication of the identification data.

At least one of the sub units may have a size or shape corresponding to the size or shape of a shipping container e.g. of 10, 20, 40 or 45 foot size. Particularly, the main unit may be 40 or 45 foot long and the sub units constituting at least one of the auxiliary units may be two 20 foot containers.

At least one of the sub units may be configured for high current components, and the other sub unit may be configured for high voltage components. The units may form safety-zones categorized differently.

One sub unit may e.g. comprise a gas based fire extinguishing system for enabling a specific classification relative to fire hazard.

The nacelle may include a system for automatic release of at least one of the sub units. This feature may be used e.g. in case of fire, where one unit may be released to prevent spreading of fire. The released unit may e.g. by lowered in a controlled manner to the ground by a cable structure including an automatic braking mechanism preventing to high lowering speed. In one embodiment, one or more of the sub units are fixed to the other sub units or the main unit by bolts which include an explosion based release mechanism and fixed by cables on a winch with a braking coupling preventing reeling speeds above a certain limit. In case of fire in the sub unit, the bolts are destroyed and the sub unit falls to ground controlled by the cables. Accordingly, the automatic release may include various means for automatically releasing the unit including power driven hooks, explosion bolts, speed dampened cables for lowering the unit etc.

Particularly, one sub unit may comprise a converter and another one of the sub units may comprise a transformer. These two sub units may particularly be directly adjacent and form one of the auxiliary units. Alternatively, at least one sub unit may comprise a converter and another one of the sub units may comprise a battery or a fuel-cell.

At least one sub unit can be detached from another one of the sub units and lowered individually.

In one embodiment, the main unit and the auxiliary units are joined in an interface forming a gap allowing air to pass from beneath the nacelle to above the nacelle through the gap. Such a gap may increase thermal convection and thus cooling of the space inside the main and auxiliary units.

In one embodiment, vibration dampening material is arranged between the main unit and the auxiliary unit. Rubber or foam material, or material with a similar elastically deformable and vibration dampening effect may be used. The dampening material may particularly be compressed between the main unit and the auxiliary unit and it may particularly be arranged where the main unit and the auxiliary unit are fixed by nails, rivets, bolts or any similar mechanical attachment.

In one embodiment, the main unit is broader than the auxiliary unit(s). That the main unit is "broader" means that its dimension in a horizontal plane, and perpendicular to the rotational axis is larger than the same dimension of the auxiliary unit(s). The main unit may particularly be broader than a shipping freight container following the dimensional and structural specifications in the ISO standard of ISO 668:2013 for series 1 freight containers, whereas the auxiliary unit(s) may have the size of, or be smaller than what is specified for those ISO standard, ISO 668:2013, series 1 freight containers.

In one embodiment, the main unit comprises a cantilever beam structure movable between a suspended and a retracted configuration. In the suspended configuration, the cantilever beam structure forms at least one and optionally several outwards projecting cantilevers configured to carry an auxiliary unit and usable for hoisting an auxiliary unit towards and away from the main unit. The outwards projecting cantilever beam structure may particularly be attached on a roof part of the main unit.

The nacelle may comprise a crane structure attached to the main unit and configured to hoist the auxiliary unit in a vertical direction from ground to a position where the unit fixation structure can connect the auxiliary unit to the main unit. This means that the crane structure is configured to hoist the auxiliary unit vertically without having to move it in other directions. This hoisting procedure is particularly suitable in combination with said unit fixation structures comprising rotatable or slidable hooks facilitating attachment without necessitating relative movement between the main and auxiliary units in other directions than vertical.

In a second aspect, a method of making a nacelle for a wind turbine is provided. The method comprises receiving at least two wind turbine components each being in a container. The two containers are joined while the components are in the containers. The auxiliary unit formed by the joining, is attached to a main unit and the main unit is attached to a wind turbine tower. The main unit may be attached to the wind turbine tower before or after the auxiliary unit is attached to the main unit, and the containers may be joined one by one to the main unit or they may be joined before they are assembled with the main unit as one single auxiliary unit.

Particularly, it may be an advantage to ship two components in individual sub units, assemble the sub units at or near the place where the wind turbine is erected to define an auxiliary unit, and assembling the main and auxiliary unit, e.g. on top of the tower.

The containers may be sealed and electronic alarms, i.e. based on unintended intrusion or undesired temperatures, water, or humidity may be provided.

The containers may be arranged to hermetically isolate one of the two wind turbine components from the other one of the two wind turbine components. Such a hermetic isolation in one selected sub unit may have several advantages. One sub unit may be hermetic, whereas an adjacent could be open and thereby allow swift pressure reduction e.g. in case of fire. By dividing the auxiliary unit into several sub units, each sub unit may be either hermetic or open depending on risk of fire etc.

The sub units may be arranged to hermetically isolate at least one of the two wind turbine components from wind turbine components in the main unit and or from wind turbine components in the other containers.

One sub unit may be released from the other container and from the main unit in response to an incident such as fire etc.

LIST OF NUMBERED EMBODIMENTS

1. A wind turbine nacelle configured for mounting on a wind turbine tower and housing a rotor-supporting assembly defining a rotational axis, the nacelle comprising:
   a main unit arranged to be connected to a wind turbine tower and housing the rotor-supporting assembly, and
   at least one auxiliary unit, wherein the main unit and the auxiliary unit are separate units assembled at a first interface, and at least one of the auxiliary units comprises at least two sub units assembled at a second interface.

2. The nacelle according to embodiment 1, wherein one sub unit forms a forward unit, another one of the sub units forms a rearward unit 3. The nacelle according to embodiment 2, wherein the forward unit and the rearward unit are aligned in a horizontal row.

4. The nacelle according to any of the preceding embodiments, wherein one sub unit forms an upper unit, another one of the sub units forms a lower unit.

5. The nacelle according to embodiment 4, wherein the upper unit and the lower unit are aligned in a vertical row.

6. The nacelle according to embodiment 5, wherein the upper unit forms a roof for the lower unit.

7. The nacelle according to any of the preceding embodiments, and the second interface extends transverse to the first interface.

8. The nacelle according to any of the preceding embodiments, wherein the auxiliary unit accommodates an operative component which interacts with a wind turbine component in the main unit.

9. The nacelle according to any of the preceding embodiments, wherein at least one sub unit accommodates an operative component which interacts with a wind turbine component in another sub unit.

10. The nacelle according to any of the preceding embodiments housing a power conversion assembly, and wherein the component is an operative component forming part of the power conversion assembly 11. The nacelle according to embodiment 10, wherein the operative component in one sub unit has a function being identical to a function of an operative component in another sub-component.

12. The nacelle according to any of the preceding embodiments, wherein at least one sub unit accommodates an operative component which is suspended directly on the main unit.

13. The nacelle according to any of the preceding embodiments, wherein at least one of the sub units has the size or shape of a shipping container of 10, 20, 40 or 45 foot size.

14. The nacelle according to any of the preceding embodiments, wherein at least one of the sub units forms a safety-zone categorised different from the other one of the sub unit with regard to a safety regulation.

15. The nacelle according to any of the preceding embodiments, wherein one sub unit comprises a gas based fire extinguishing system.

16. The nacelle according to any of the preceding embodiments, comprising automatic release of at least one of sub unit.

17. The nacelle according to any of the preceding embodiments, wherein at least one sub unit comprises a first operative component and another one of the sub units comprises a second operative component, the first and second operative components forming parts of the same power conversion assembly.

18. The nacelle according to any of the preceding embodiments, wherein at least one sub unit comprises a converter and another one of the sub units comprises a battery.

19. The nacelle according to any of the preceding embodiment, wherein at least one sub unit can be detached from another one of the sub units and lowered individually.

20. The nacelle according to any of the preceding embodiments, wherein the main unit and the auxiliary unit are arranged side by side in a direction away from the rotational axis.

21. A method of making a nacelle for a wind turbine, the method comprising receiving at least two wind turbine components each being encapsulated in a container and attaching the two containers with the encapsulated components to a main unit of the nacelle.

22. The method according to embodiment 21, wherein the main unit is attached to a wind turbine tower, and wherein the two wind turbine components remains encapsulated in the containers until the main unit is attached to the tower.

LIST OF DRAWINGS

In the following, embodiments of the disclosure will be described in further details with reference to the drawing in which:

FIGS. 1*a* and 1*b* illustrate wind turbines;

Figure 21:
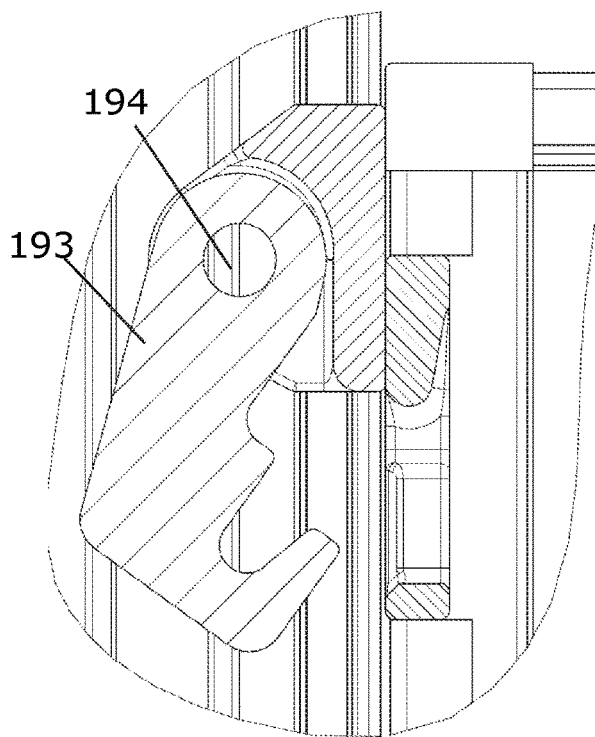
Figure 22:
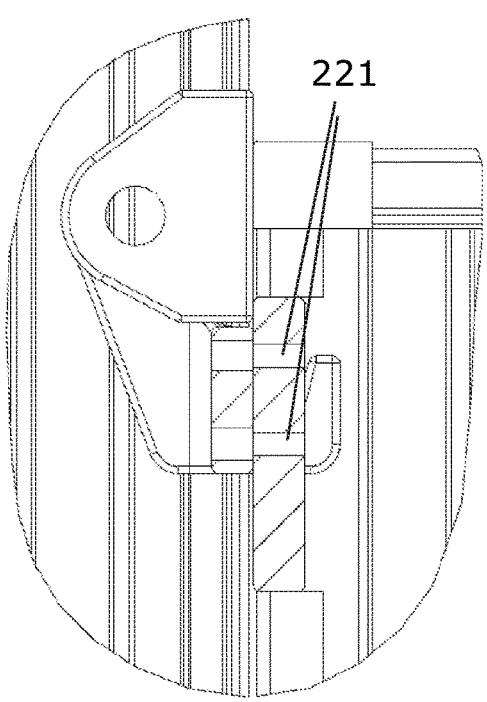
Figure 23:
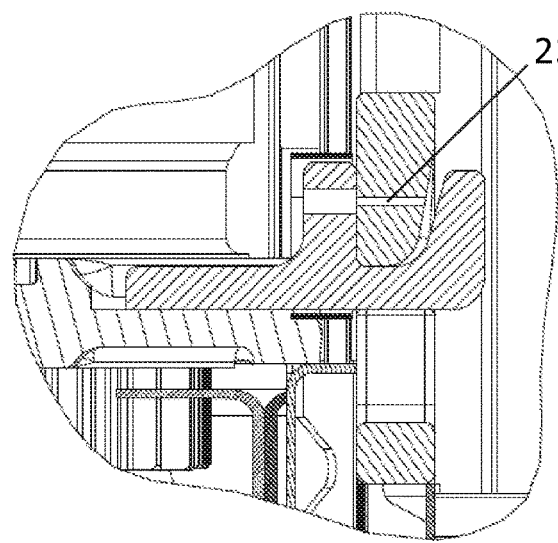
Figure 24:
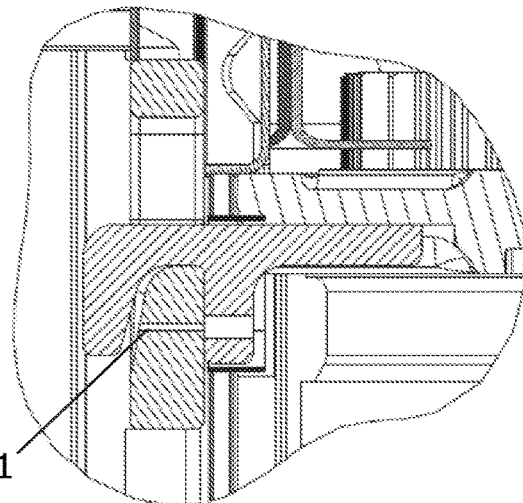
Figure 25A:
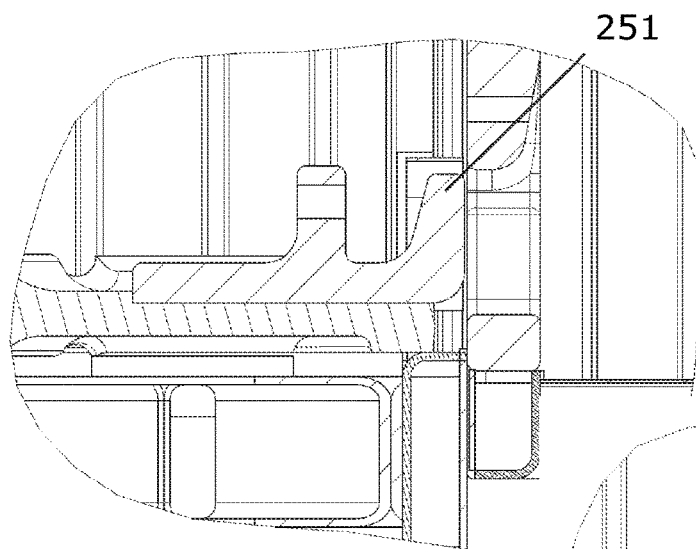
Figure 25B:
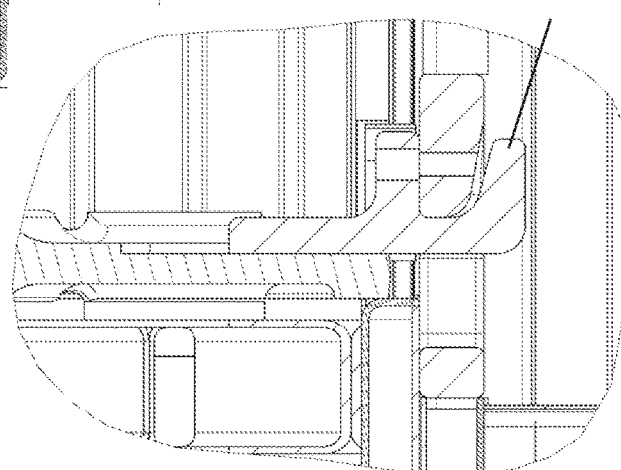
Figure 26:
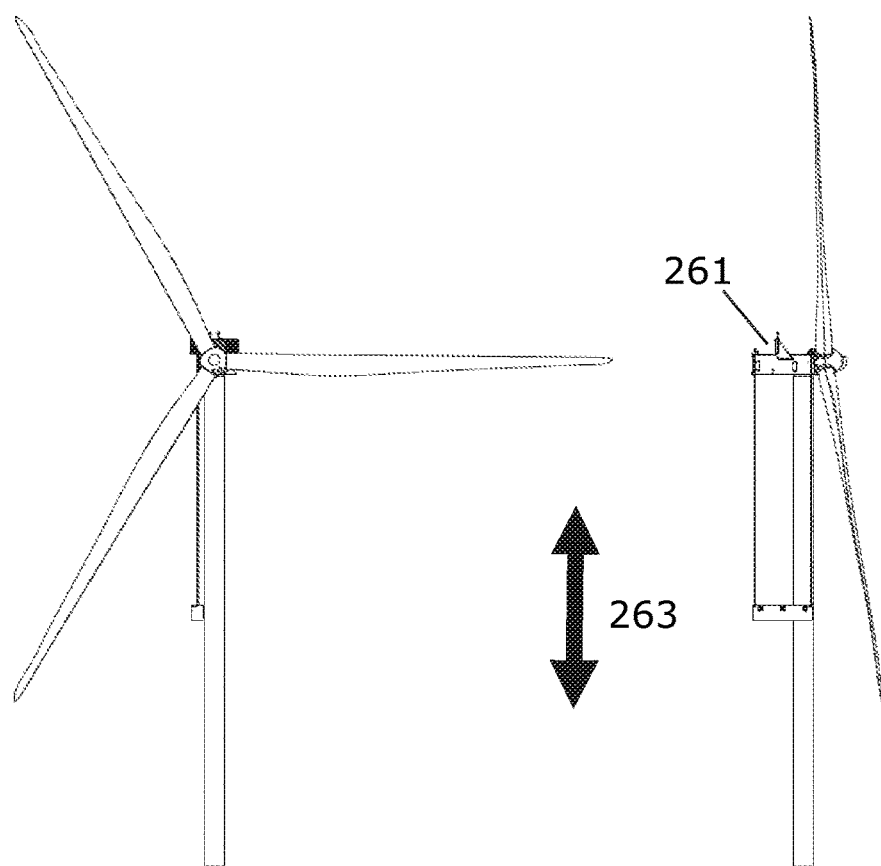
Figure 27:
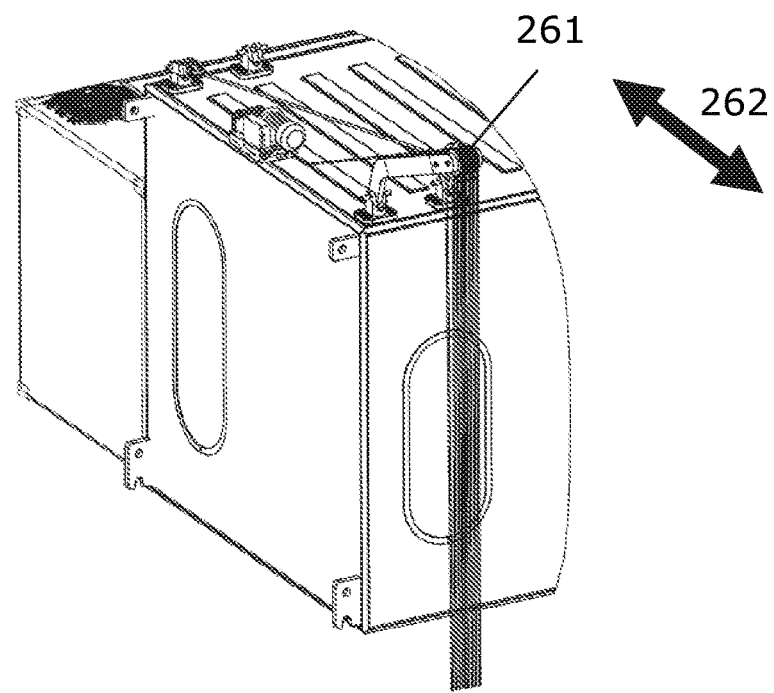
Figure 28:
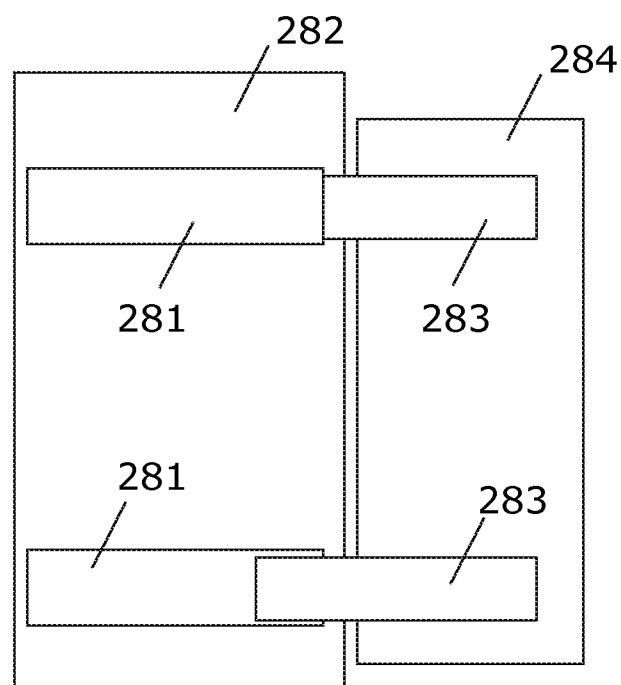

FIGS. 19*a*, 19, 19*c*, and 20 illustrate further details of a hook for attaching the auxiliary unit to the main unit;

FIG. 21 illustrates the hook in an open position where the auxiliary unit is free to be lowered to the ground;

FIG. 22 illustrates a cross section with two bolt holes for attachment of the auxiliary unit on the main unit;

FIGS. 23, 24, 25 illustrate an embodiment where the hook is slidingly suspended; and FIGS. 26-28 illustrate embodiments of cranes on the main unit for hoisting the auxiliary units.

DESCRIPTION OF EMBODIMENTS

The detailed description and specific examples, while indicating embodiments, are given by way of illustration only, since various changes and modifications within the spirit and scope of this disclosure will become apparent to those skilled in the art from this detailed description.

Figure 1A:
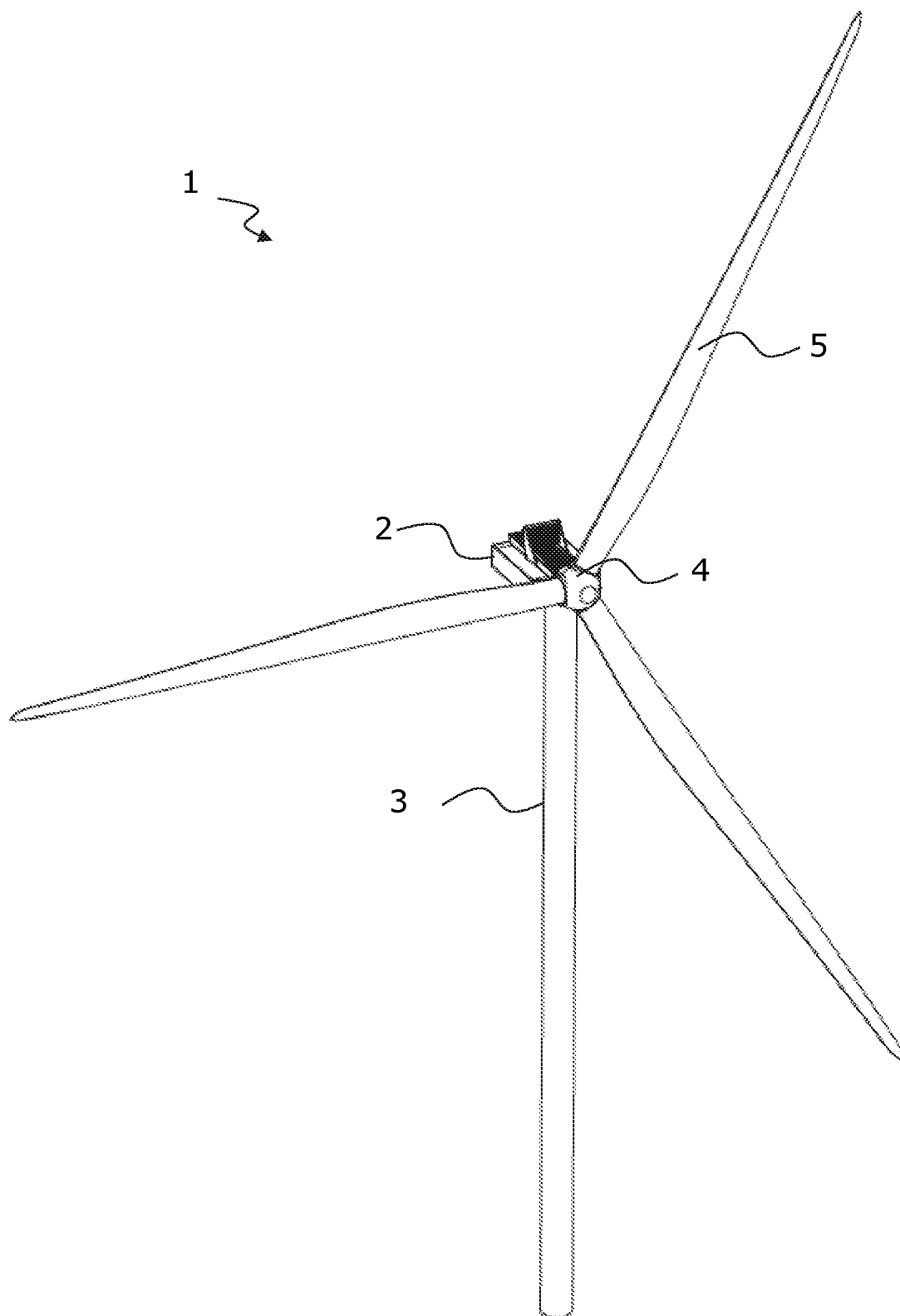
Figure 1B:
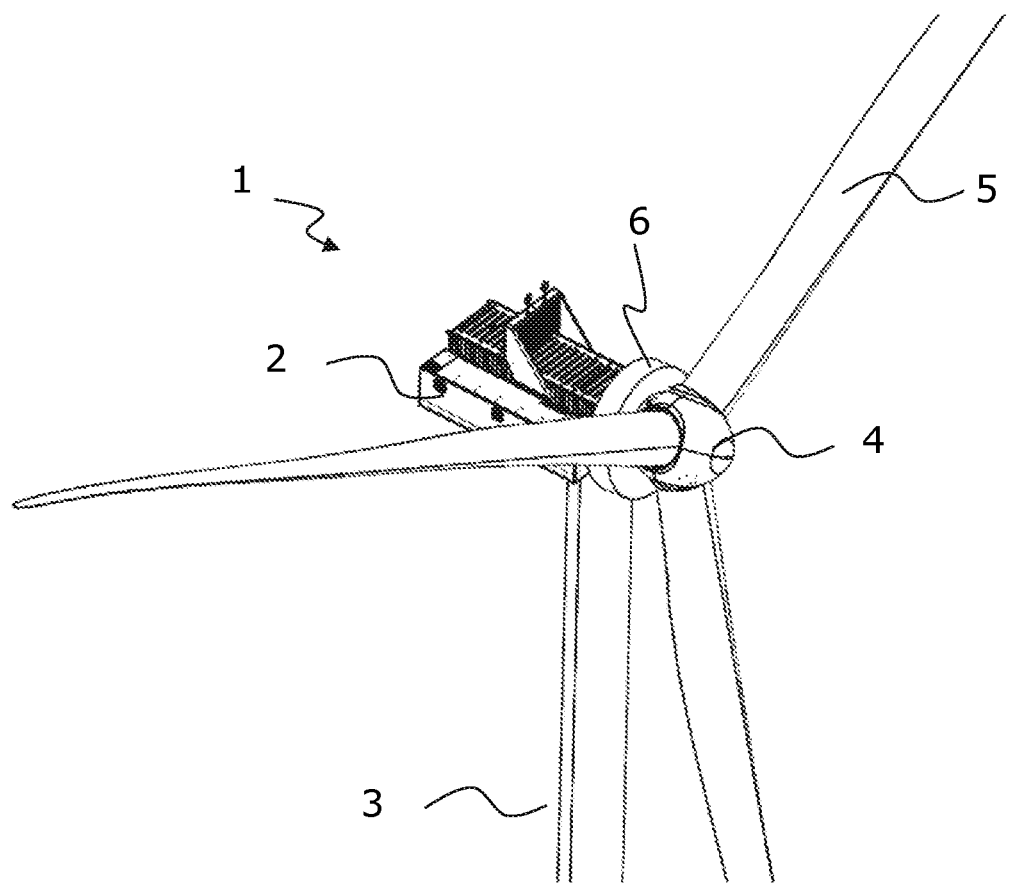

FIGS. 1*a* and 1*b* illustrate wind turbines 1 with a nacelle 2 mounted on a tower 3. A hub 4 carrying three rotor blades 5 forms a rotor and is carried by a rotor-supporting assembly in the nacelle 2. Typically, the rotor-supporting assembly comprises a rotor shaft connecting a gear arrangement and a generator to the hub. A gear is, however, not always required since the generator could be directly driven by the shaft. FIG. 1*b* illustrates a direct drive wind turbine with the generator 6 located outside the nacelle.

Figure 2:
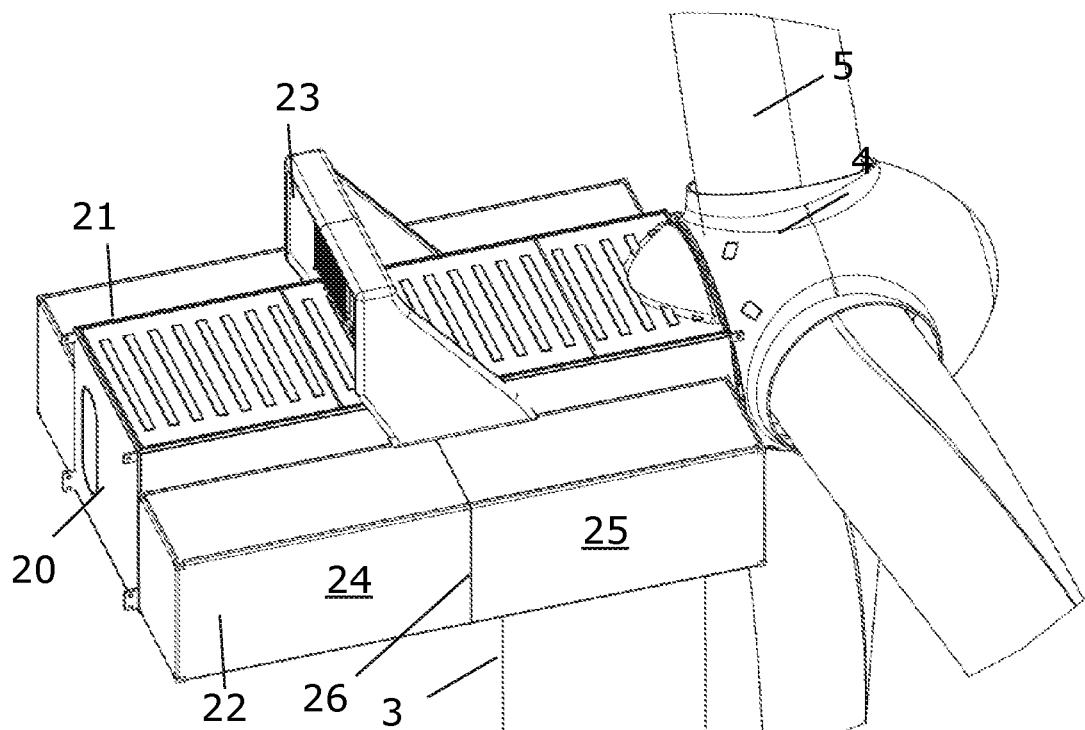
FIG. 2 illustrates the nacelle of the wind turbine.

FIG. 2 illustrates that the nacelle comprises a main unit 20 and two auxiliary units 21, 22. A cooling area 23 is arranged on top of the nacelle. The cooling area is formed by a heat exchanger which may form part of the main unit, and/or any of the auxiliary units. The main unit 20 is mounted on the tower 3 via a yawing arrangement (not shown), allowing the nacelle 2 to rotate in order to direct rotor blades carried by the hub 4 into the wind. The auxiliary unit 22 is divided into two separate sub units 24, 25 which are both joined to the main unit as two separate sub units. Additionally, the sub units could be joined along the second interface 26 to form the auxiliary unit as one assembled entity.

Figure 3:
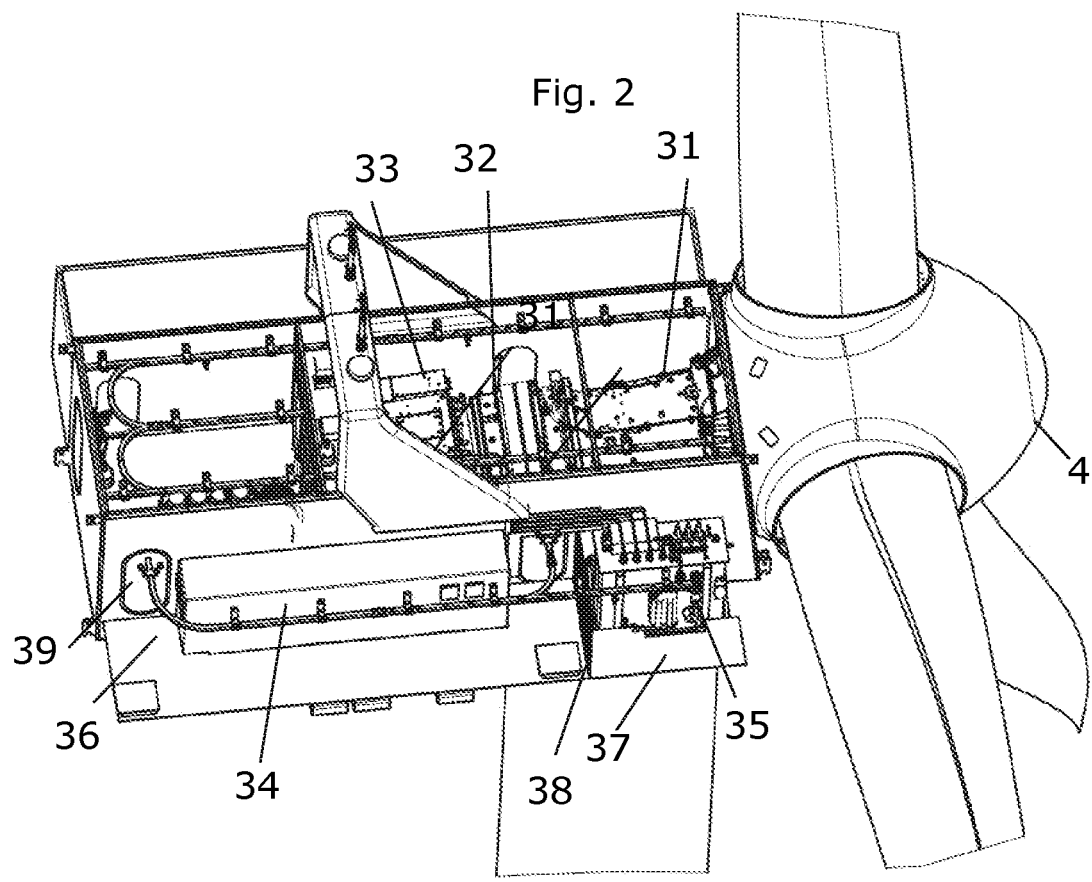
FIG. 3 illustrates a perspective view of the nacelle 2 of FIG. 2.

FIG. 3 illustrates a perspective view of the nacelle 2 of FIG. 2. In FIG. 3 the outer walls of the nacelle 2 are transparent, thereby revealing the interior parts of the nacelle 2 and the wind turbine components accommodated therein. The main unit 20 accommodates a main bearing unit 31, a gear arrangement 32 and a generator 33, arranged sequentially behind the hub 4, along a direction defined by the rotational axis of the hub 4.

The auxiliary unit 21 accommodates a transformer unit 34 in a rearward sub unit 36, and a converter unit 35 in a forward sub unit 37. The division between the sub units is illustrated by the transverse bulkhead 38. The rearward and forward units are separate units which can be separated from each other and which can be separated individually from the main unit.

Each auxiliary unit 21, 22 is mounted along a side of the main unit 20 via a first interface. In the disclosed embodiment, they are mounted in such a manner that one auxiliary unit 21 is mounted along a right side of the main unit 20 and the other auxiliary unit 22 is mounted along a left side of the main unit 20, as seen in a direction along a rotational axis of the hub 4 from the hub 4 towards a rear wall of the main unit 20. The sub units are joined along a second interface. As illustrated by the bulkhead 38, the second interface may extend perpendicularly to the first interface.

The main unit and the auxiliary units comprise cooperating openings 39 allowing personnel to enter from a main space in the main unit into an auxiliary space in the auxiliary unit. In a similar manner, the sub units may comprise cooperating openings allowing personnel to enter from one sub unit into an adjacent sub unit.

Figure 4:
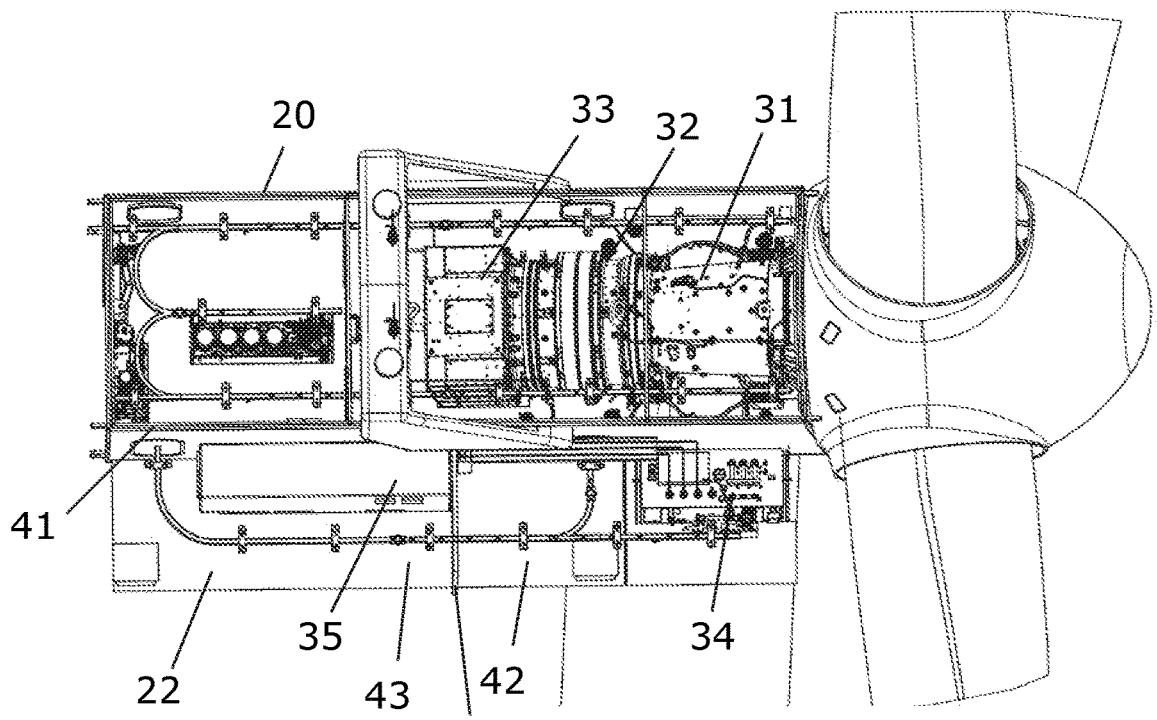
FIG. 4 illustrates the nacelle from FIG. 3 but seen from above.

FIG. 4 illustrates the nacelle from FIG. 3 but seen from above. Both of the sub units 42, 43 of the auxiliary unit 22 have a wall part against the wall of the main unit. The bulkhead 44 is placed between the converter unit 35 and the transformer unit 34 and indicates the second interface and split between two sup units constituting the auxiliary unit 22.

Figure 5:
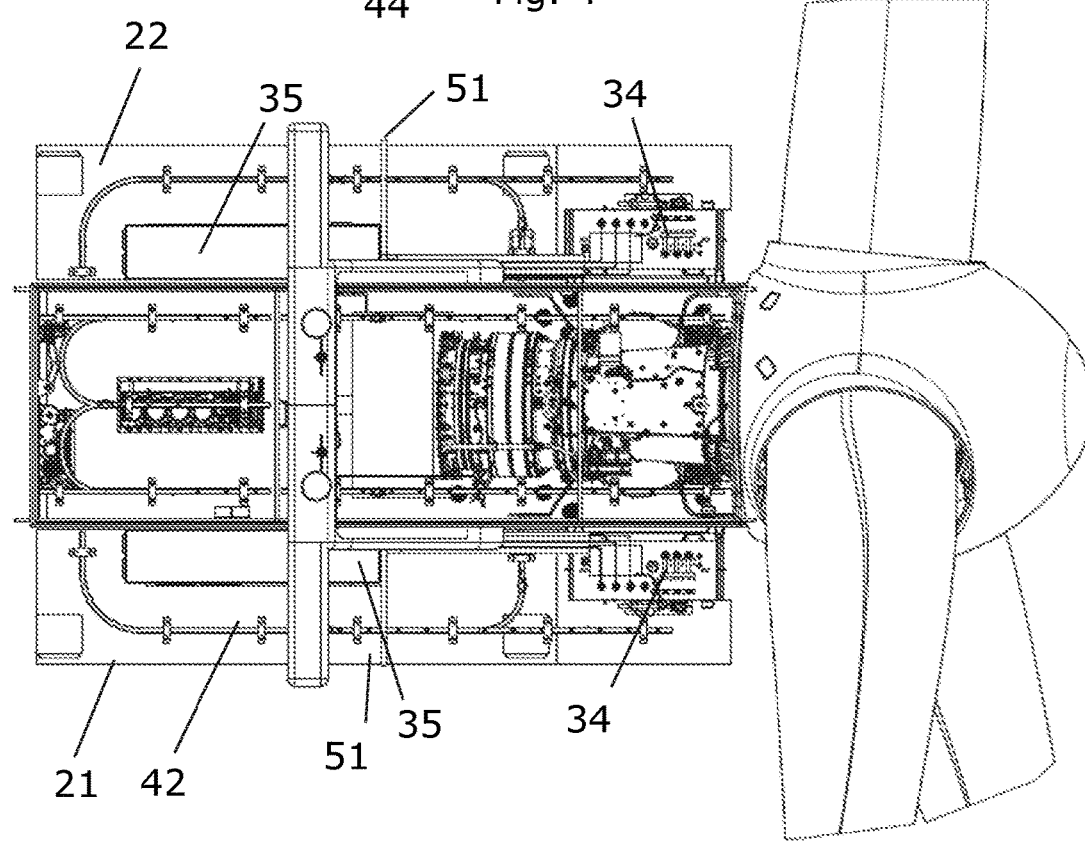
FIG. 5 illustrates an embodiment where the left and right side auxiliary units contain identical components.

FIG. 5 illustrates an embodiment where the left and right side auxiliary units contain at least one identical component establishing a weight balance and a double function. The double function means that the wind turbine comprises two identically functioning components, one contained in each of the auxiliary units. In case of failure, the wind turbine may continue operational on half power while the operative component in one of the auxiliary units is replaced. In FIG. 5 it is further illustrated that both of the auxiliary units 21, 22 comprises two sub units separated by the bulkheads 51. Accordingly, each of the double functioning components, i.e. the transformer or the converter, may be replaced individually in each of the two auxiliary units.

Figure 6:
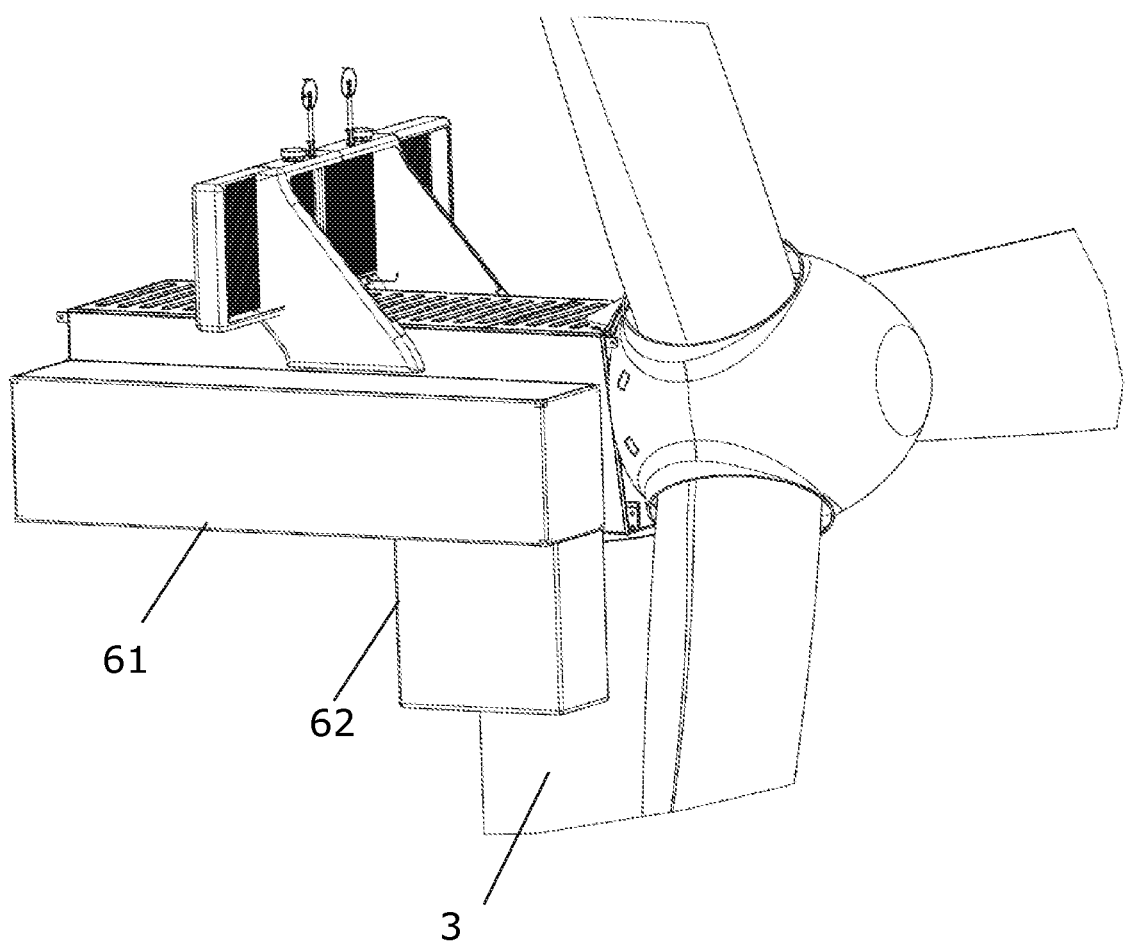
FIG. 6 illustrates an embodiment where two auxiliary units 61, 62 are located one above the other.

FIG. 6 illustrates an embodiment where two sub units 61, 62 are located one above the other. The sub unit 61 is an upper sub unit constituted by a 40 foot container, and the sub unit 62 is a lower sub unit constituted by a 20 foot container.

Figure 7:
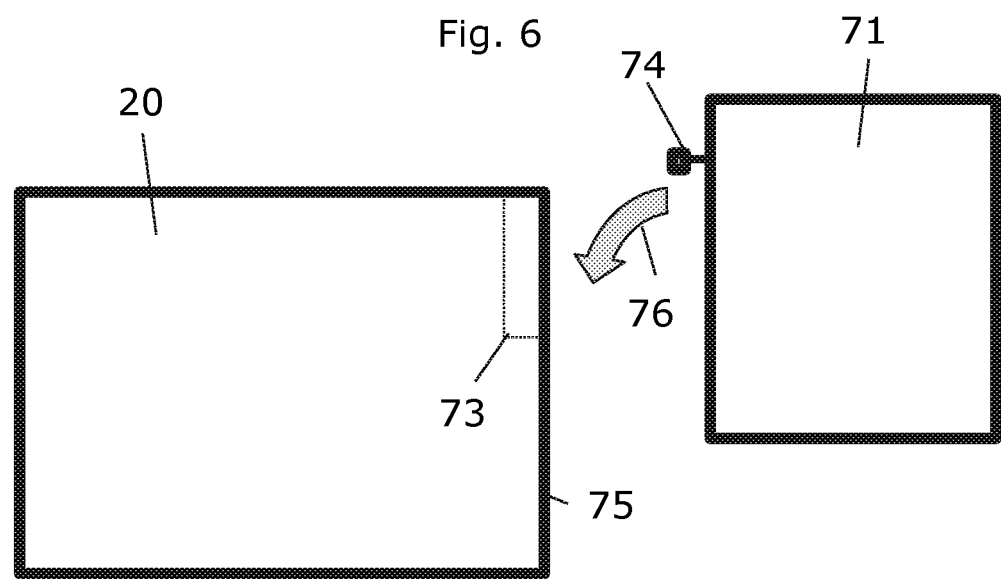
FIG. 7 illustrates schematically details of the interface between the main unit and one of the sub units.

FIG. 7 illustrates details of the first interface. The interface joins the main unit 20 with the sub unit 71 in a releasable manner and allows one sub unit of an auxiliary unit to be replaced e.g. during maintenance. The interface is constituted by an inward track or track 73 in one of the sub-units 72. The track 73 is illustrated with a dotted line and defines a recess into the outer surface 75. The track has a C-shaped profile in a horizontal cross section, i.e. when seen from above. the track is configured to receive the projection 74 provided on the sub unit, and particularly it can receive the projection 74 in a very simple procedure where the sub unit 71 is lowered down along the outer surface 75 of the main unit 20. This is illustrated by the arrow 76. This very simple procedure allows easy replacement of a sub unit without detachment of the entire auxiliary unit from the main unit.

Figure 8:
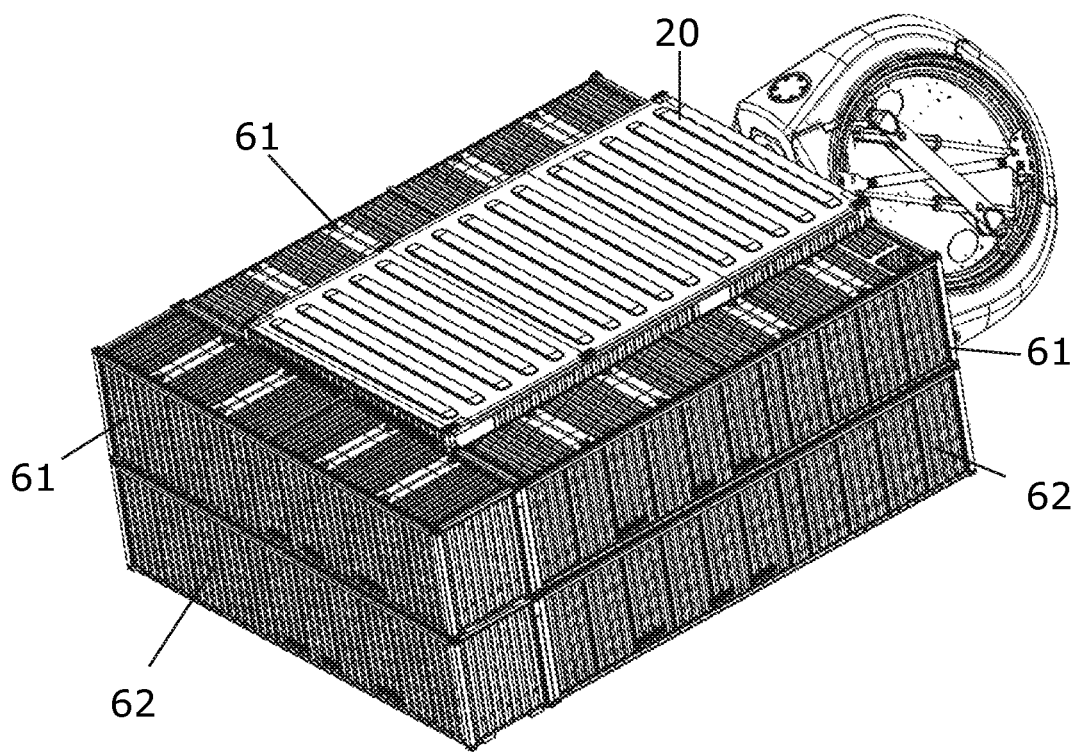
FIGS. 8-9 illustrate the main unit and auxiliary unit in an embodiment where the sub units are arranged in a vertical row.
Figure 9:
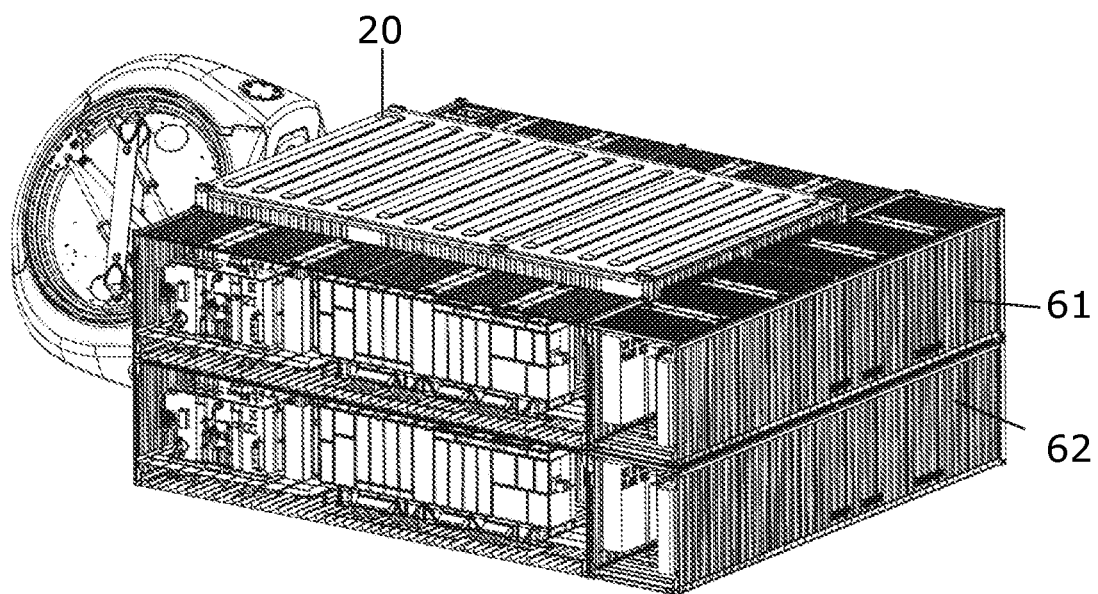

FIGS. 8-9 illustrate an embodiment wherein the nacelle comprises a main unit 20 and three auxiliary units each constituted by two sub units 61, 62. In the illustrated embodiment, each sub unit is attached directly to the main unit, but they could also be attached to the other sub unit. The upper sub unit 61 and the lower sub unit 62 are identical units aligned in a vertical row. Since the upper unit and the lower unit have identical shapes and sizes when seen in a horizontal cross section, the upper unit forms a roof over the lower unit.

In this embodiment, the auxiliary unit, i.e. the stack of two sub units have nearly the height of the main unit, and both sub units are suspended at the same sidewall of the main unit. The auxiliary units are provided on the rear end of the main unit, and on opposite sides of the main unit 20.

Even though the auxiliary units are attached at a side wall on the right side, the left side, or the rear side of the main unit, the load of the auxiliary units could be carried by a more rigid structure at the side wall or within the main unit, e.g. a main frame of the nacelle which is arranged to carry the rotor-assembly and transfer the load of the rotor assembly into the tower.

FIG. 9 illustrates the same nacelle but with sides of the sub units removed to illustrate that the upper unit units 61 are identical to the lower units 62, i.e. they contain the same components, in this case a transformer and converter.

Figure 10:
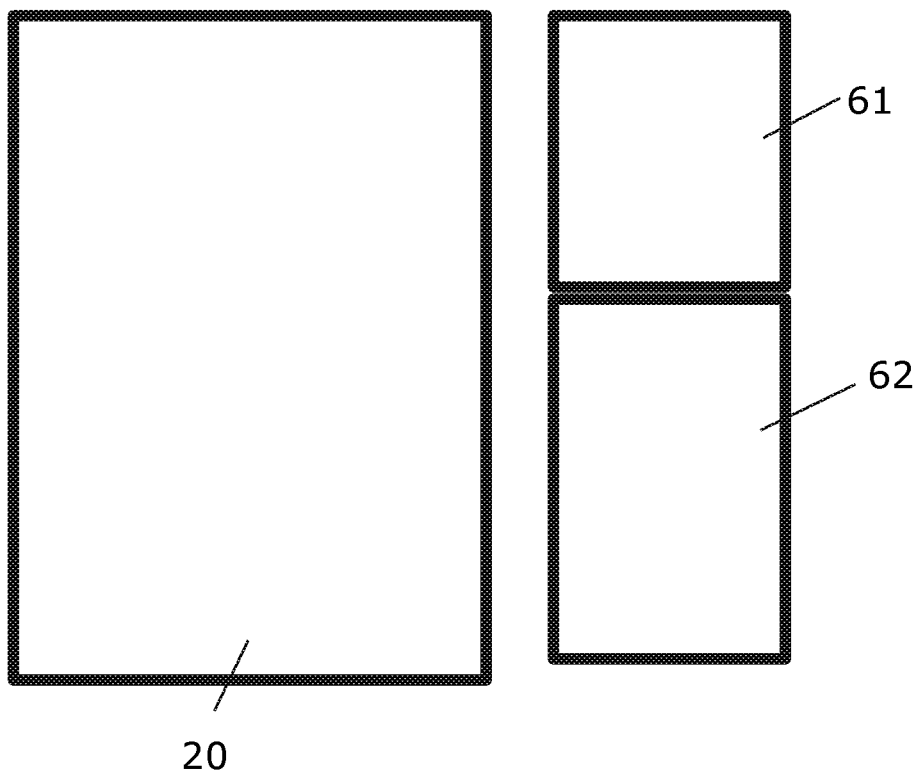
FIGS. 10-11 illustrate details of different layouts with a gap between the units.
Figure 11:
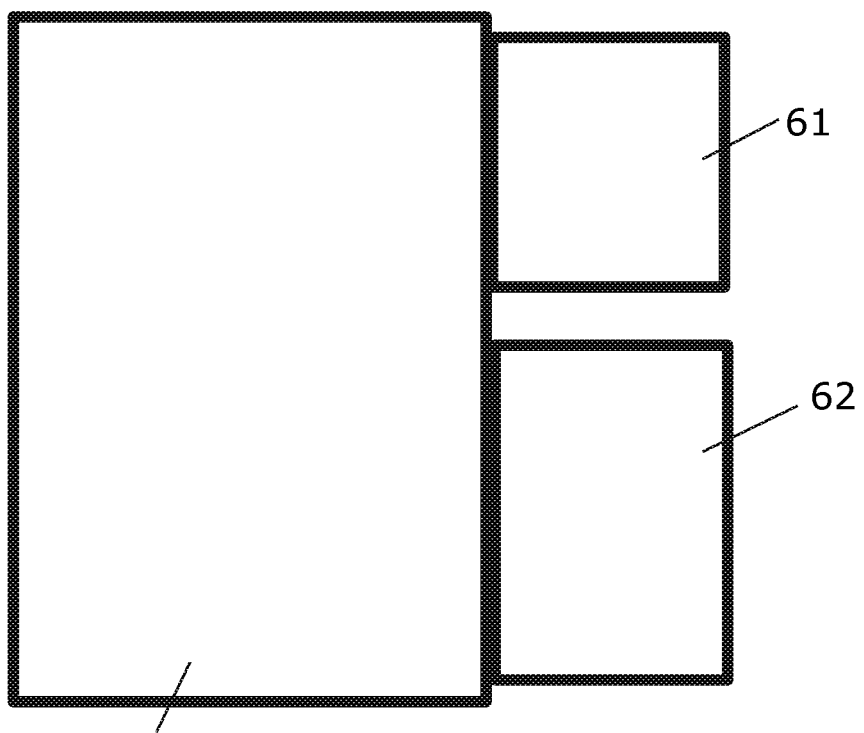

FIGS. 10-11 illustrate different layouts provided by the first and second interfaces respectively.

In FIG. 10, the first interface provides a gap between the main unit and the auxiliary unit. This gap allows air to pass between the main and auxiliary units and thereby supports efficient cooling by convection. Additionally, the gap increases safety e.g. by preventing fire to spread.

In FIG. 11, a gap is defined between the sub units of the auxiliary unit. Again, the gap allows air to pass between the sub units of the auxiliary units and thereby supports efficient cooling by convection and increases safety.

FIGS. 12-15 illustrate four different embodiments of a unit fixation structure forming part of the second interface, i.e. embodiments of interfaces between two sub units of an auxiliary unit. In each of these four illustrations, the first sub unit, 121 and the second sub unit 122 are connected by cooperating structures described below.

Figure 12:
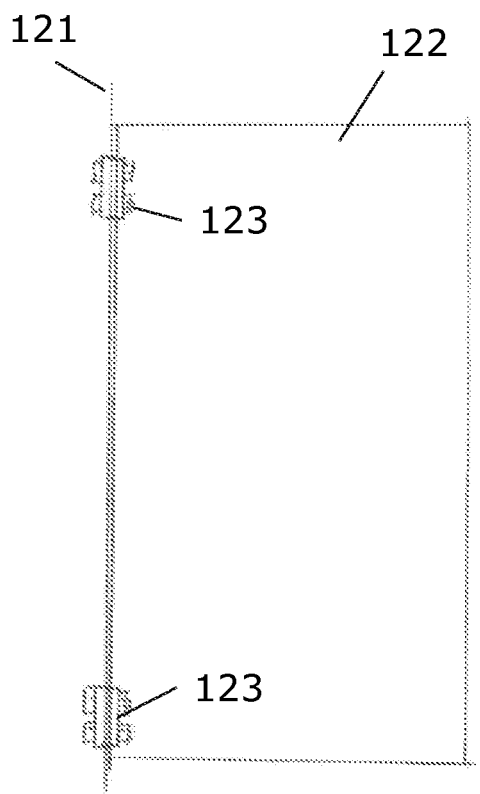
FIGS. 12-15 illustrate 4 different embodiments of interfaces between the main unit and the auxiliary unit.

In FIG. 12, the cooperating structures are constituted by brackets 123 by which the first and second sub units are joined by bolts.

Figure 13:
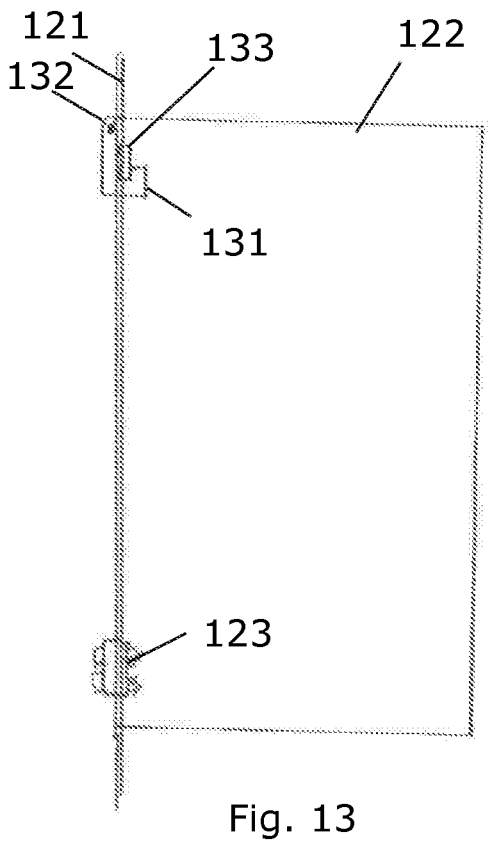

In FIG. 13, the cooperating structures are constituted by a lower bracket 123 similar to the one used in FIG. 12. At the upper edge, the first sub unit and second sub unit are assembled by a hook 131 pivotally joined to the first sub unit at the hinge point 132. The hook can rotate as indicated by the arrow 133 and engages the edge-bracket 134 of the second sub unit when in the illustrated position. When the lower bracket 123 is removed, and the hook 131 is rotated into the first sub unit, the second sub unit can be lowered to the ground.

Figure 14:
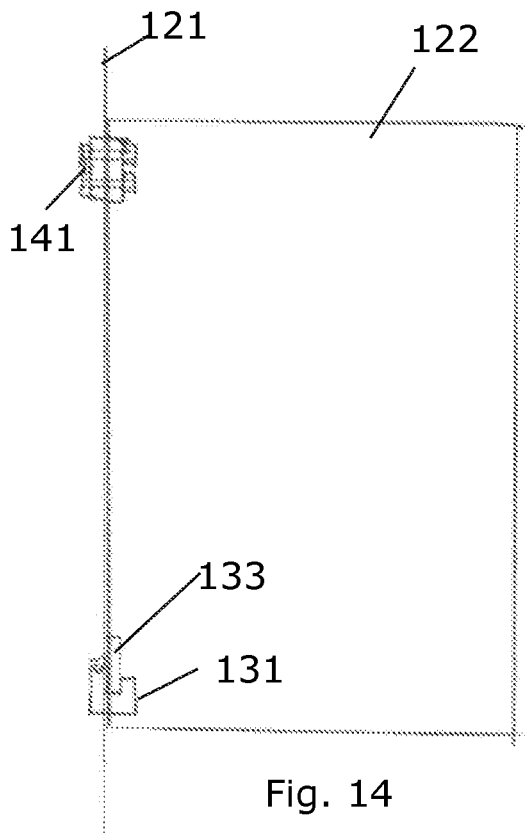

The embodiment in FIG. 14 is comparable to the embodiment in FIG. 13, but where the lower bracket is replaced with an upper bracket 141, and the hook is placed at a lower edge.

Figure 15:
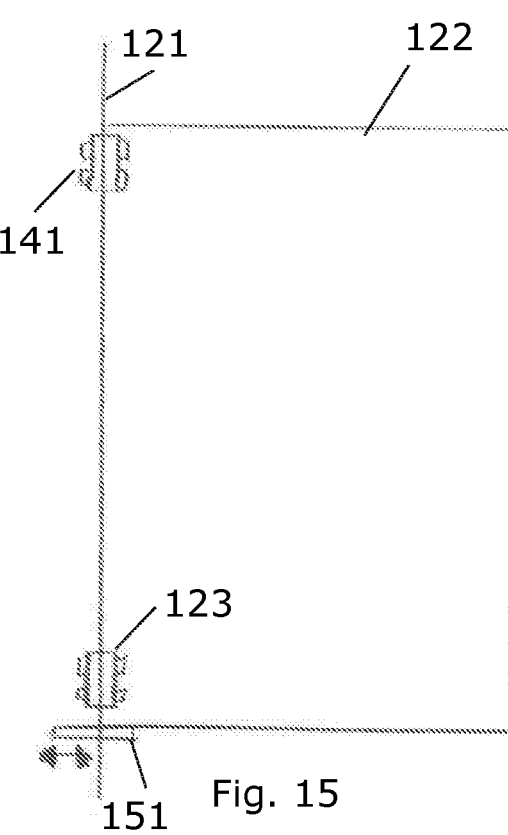

In FIG. 15, a lower and an upper bracket is used for bolting the second sub unit to the first sub unit, and a slidable support 151 supports the lower surface of the second sub unit while the bolts are attached. If it is desired to lower the second sub unit to the ground, e.g. for replacement or maintenance of the operative component, the slidable support can be slided to the left and the second sub unit can be lowered down, e.g. by use of a crane build into the first sub unit. In any of the embodiments shown in FIGS. 12-15, the brackets or hooks direct the load from the auxiliary unit into a rigid part of the main unit, e.g. into load carrying column e.g. a corner column of the main unit. Various structural features may connect the brackets or hooks which carry the auxiliary unit directly to the main frame in the main unit to thereby establish a load path into the tower.

Figure 16:
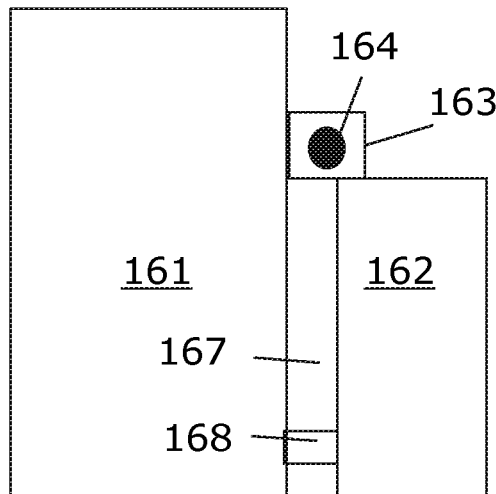
FIGS. 16-18 illustrate an embodiment where the main unit and auxiliary units are assembled by a hinge structure.
Figure 17:
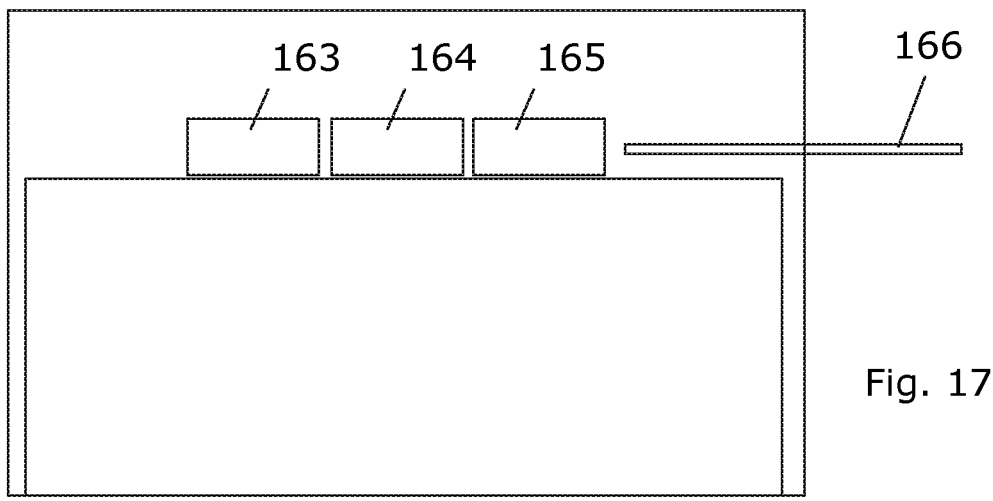
Figure 18:
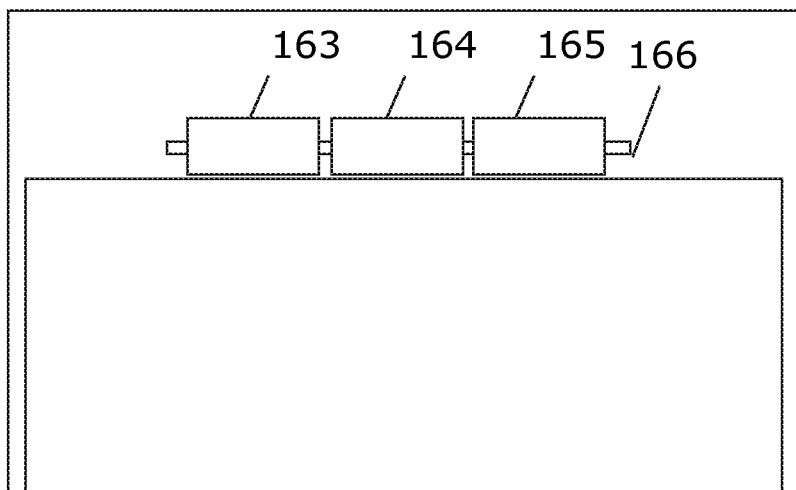

FIGS. 16-18 illustrate an embodiment where the first sub unit and second sub units are assembled by a hinge structure comprising hinge elements 163, 164, 165 with a hole for receiving a hinge pin 166 extending through the hinge elements. FIG. 16 further shows that the interface forms a gap 167 allowing air to pass e.g. from beneath the nacelle to above the nacelle, through the gap. The gab is held open at the bottom by the distance element 168, which could be constituted by a number of pins or an open structure allowing air to pass between the units.

Such a gap may increase thermal convection and thus cooling of the space inside the first and second sub units. The gap is not limited to the embodiment with the hinge structure but could be combined with any other assembly method.

FIGS. 17 and 18 illustrate the hinge elements 163, 164, 165 and the hinge pin 166. In FIG. 17, the hinge elements are positioned correctly relative to the each other such that the hinge pin can be slided into the hinge elements. In FIG. 18, the hinge pin is inserted through the holes of the hinge elements.

Figure 19A:
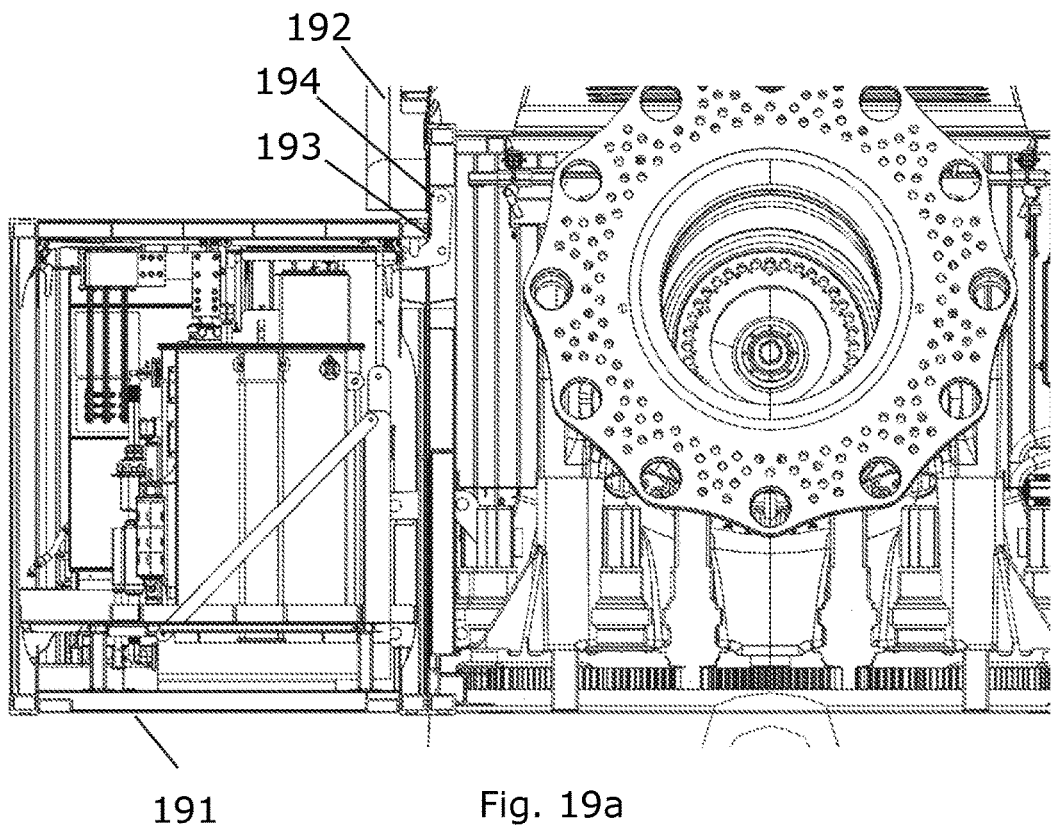
Figure 19B:
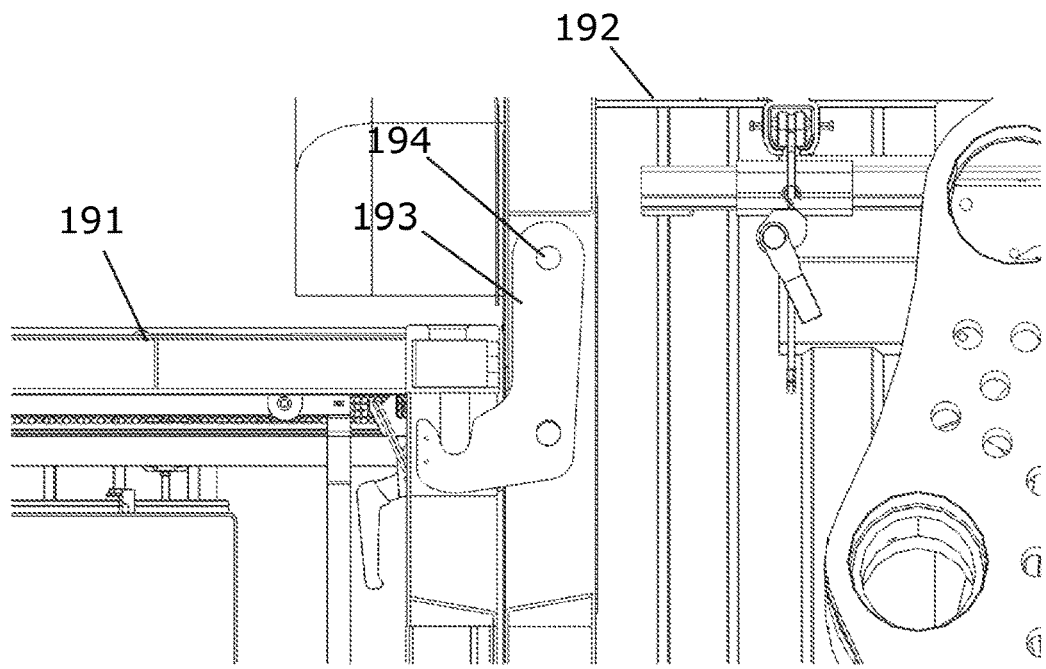
Figure 19C:
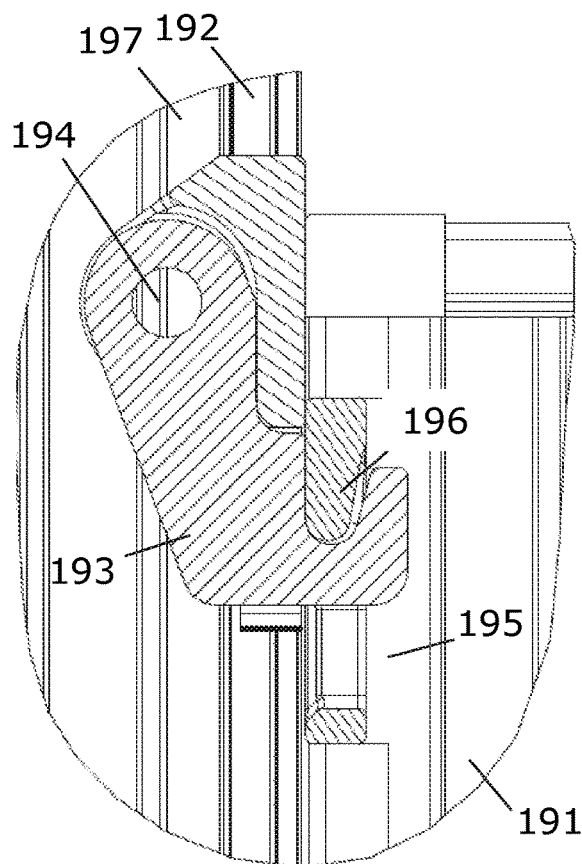

FIGS. 19a, 19b, and 19c illustrate further details of a hook for attaching the one unit 191 to another unit 192, e.g. a sub unit to the main unit or an sub unit to another sub unit—herein just referred to as first and second units. The hook 193 is suspended rotationally at the hinge 194 in the first unit and catches a recess or edge 195 in the second unit.

Figure 20:
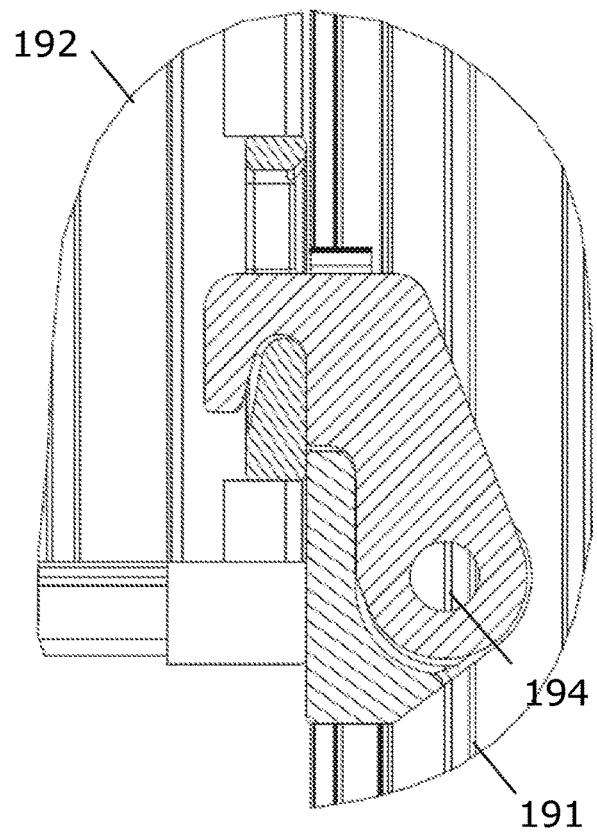

The hook could also be attached in the second unit and catch a recess or edge in the first unit, in which case it may be attached reversely, i.e. as illustrated in FIG. 20. The hook may be positioned by use of an actuator.

FIG. 21 illustrates the hook in an open position where the second unit is free to be lowered to the ground.

FIG. 22 illustrates a cross section where two bolt holes 221 can be seen. The bolt holes facilitate attachment of the second sub unit on the first sub unit by use of bolts for solid fixation. In this embodiment, the hook is mainly for positioning the second sub unit in the correct height relative to the first sub unit, and the bolts are for joining the units.

In FIGS. 19, 21 and 22, the hook is preferably supported by a rigid frame structure, e.g. via column or support posts arranged along an inner surface of the unit which holds the hook. In FIG. 19, the column 197 extends along an inner surface of the unit and supports the hook on the main frame in the bottom part of the unit.

The hook could be moved between the open position (FIG. 21) and the closed position (FIG. 19, 20, 22) by power driven means, e.g. including a hydraulically driven actuator.

FIGS. 23, 24, 25 illustrate an embodiment where the hook is not rotationally suspended but slidingly suspended. The function is similar to the embodiment of FIGS. 19-22. In FIGS. 23 and 24, a cross sectional view illustrates a bolt hole 231 which can be used for solid, bolted joining of the units.

In FIG. 25a, the hook 251 is slided to the left thereby disengaging the edge of the auxiliary unit and allowing the auxiliary unit to be lowered to the ground. In FIG. 25b, the hook 251 is slided to the right, thereby engaging the edge of the auxiliary unit and holding the two units fixed to each other. The hook may be slided by power driven means, e.g. by a hydraulic actuator.

In the description above, FIGS. 19-25 are explained as parts of the unit fixation structure for joining the units.

FIG. 26 illustrates hoisting a unit up or down during maintenance or replacement. The unit is hoisted by use of a crane 261 forming part of the main or forming part of one of the sub units. Movement is essentially only in the vertical plane, illustrated by the arrow 263, and the attachment of the auxiliary unit or one of the sub units may be facilitated by a unit fixation structure as described previously, including movable fixation features such as hinged or slidable hooks etc.

FIG. 27 illustrates the internal crane 261 in an enlarged view. The crane is attached to a roof part of the main unit or one of the sub units and by its location, it can hoist other units in a vertical direction to a position where said unit fixation structures can form engagement between the units. This procedure may not require movement in other directions than the vertical direction and therefore facilitates a simple assembly procedure with reduced need for external crane assistance. For adjustment in a horizontal plane, the crane 261 may have the option of moving horizontally, e.g. as illustrated by the arrow 262.

FIG. 28 illustrates schematically, another crane structure with a double cantilever beam 281 on the roof of the main unit 282 or on the roof of one of the sub units. The cantilever beam 281 can extend sideways in telescopic section 283. The cantilever beam facilitates lifting and connection of another unit 284. Even though the unit fixation structures disclosed herein, including pivotable or slidable hooks, generally facilitate attachment of the auxiliary unit or sub unit by hoisting only in the vertical direction, the in and out movement facilitates fine adjustment of a horizontal distance between the main unit and the auxiliary unit.

DEFINITIONS

Herein, the term "nacelle" means the generally accepted term describing the machine house for a wind turbine, i.e. that part which carries the rotor and drivetrain and which is carried by the wind turbine tower.

The terms "main unit" and "auxiliary unit" herein refers to units which can be transported separately, and which can be assembled with one or more other units to form the nacelle.

Herein, the term "rotor-supporting assembly" refers to those parts of the nacelle which carries the rotor, typically a drivetrain, a main bearing and a main frame. The drivetrain may include different components depending on the type of wind turbine, e.g. a rotor shaft, the generator, and optionally a gearbox between the rotor shaft and the generator.

The invention claimed is:

1. A wind turbine nacelle configured for mounting on a wind turbine tower and housing a rotor-supporting assembly defining a rotational axis, the nacelle comprising:
   a main unit arranged to be connected to a wind turbine tower and housing the rotor-supporting assembly, and
   at least one auxiliary unit,
   wherein the main unit and the at least one auxiliary unit are separate units assembled at a first interface, and
   wherein the at least one auxiliary unit comprises at least two sub units individually attached to the main unit at the first interface.

2. The nacelle according to claim 1, wherein one of the at least two sub units forms an upper unit and another one of the at least two sub units forms a lower unit arranged below the upper unit and aligned therewith in a vertical row.

3. The nacelle according to claim 2, wherein the upper unit forms a roof for the lower unit.

4. The nacelle according to claim 2, wherein the lower unit and the upper unit have the same shapes and/or sizes when seen in a horizontal cross section.

5. The nacelle according to claim 2, wherein the at least one auxiliary unit formed by the upper and the lower sub unit has a height which is between 80 and 120 percent of a height of the main unit.

6. The nacelle according to claim 2, wherein the main unit defines sidewalls extending between a bottom and a roof, and wherein both the lower and the upper unit are suspended on the main unit at the same sidewall of the main unit.

7. The nacelle according to claim 1, wherein the at least two sub units are identical units.

8. The nacelle according to claim 1, wherein a gap is defined between the main unit and the at least one auxiliary unit and/or between the at least two sub units of the at least one auxiliary unit, said gap allowing air to pass between the main unit and the at least one auxiliary unit and/or between the at least two sub units of the at least one auxiliary unit.

9. The nacelle according to claim 8, wherein the gap is defined both between the main unit and the at least one auxiliary unit and between the at least two sub units of the at least one auxiliary unit.

10. The nacelle according to claim 9, wherein the gap between the at least two sub units and between the at least one auxiliary unit and the main unit are interconnected.

11. The nacelle according to claim 1, comprising an entrance from the main unit to at least one of the at least two sub units.

12. The nacelle according to claim 1, comprising an entrance from one of the at least two sub units to another of the at least two sub units.

13. The nacelle according to claim 1, wherein each of the at least two sub units forms a space which is separated air-tightly from a space in the main unit, and optionally wherein each of the at least two sub units is separated air-tightly from the space in the other of the at least two sub units.

14. The nacelle according to claim 1, wherein at least one of the at least two sub units forms a safety-zone categorized different from another one of the at least two sub units with regard to a safety regulation.

15. The nacelle according to claim 1, wherein one of the at least two sub units comprises a gas based fire extinguishing system.

16. The nacelle according to claim 1, comprising automatic release of at least one of the at least two sub units, the automatic release allowing removal of the at least one sub unit from the main unit and from the other at least two sub units.

17. The nacelle according to claim 1, wherein one of the at least two sub units forms a forward unit, wherein another one of the at least two sub units forms a rearward unit, and wherein the forward unit and the rearward unit are aligned in a horizontal row.

18. The nacelle according to claim 1, wherein at least one of the at least two sub units has the size or shape of a shipping container of 10, 20, 40 or 45 foot size.

19. A wind turbine comprising the nacelle according to claim 1.

20. The nacelle according to claim 1, wherein the at least two sub units of the at least one auxiliary unit are assembled in a second interface.

21. A method of making a nacelle for a wind turbine, the nacelle comprising a main unit and at least one auxiliary unit, the at least one auxiliary unit including at least two sub units, the method comprising:
receiving at least two wind turbine components each being encapsulated in a container forming a respective one of the at least two sub units, and
attaching the at least two sub units with the encapsulated components therein to the main unit of the nacelle at a first interface,
wherein attaching the at least two sub units includes individually attaching each of the at least two sub units to the main unit at the first interface.

22. The method according to claim 21, further comprising attaching the main unit to the wind turbine tower, wherein the two wind turbine components remain encapsulated in their respective containers of the at least two side units until the main unit is attached to the tower.

23. The method according to claim 21, further comprising hermetically isolating one of the at least two wind turbine components from another one of the at least two wind turbine components.

24. The method according to claim 21, further comprising hermetically isolating at least one of the at least two wind turbine components from a wind turbine component in the main unit.

25. The method according to claim 21, further comprising releasing one container of the at least two sub units from another container of the at least two sub units and from the main unit in response to an incident.

* * * * *